United States Patent [19]

Irani et al.

[11] Patent Number: 4,527,896
[45] Date of Patent: Jul. 9, 1985

[54] INFRARED TRANSDUCER-TRANSMITTER FOR NON-CONTACT TEMPERATURE MEASUREMENT

[75] Inventors: Keikhosrow Irani, Franklin Lakes; Michael G. MacBurney, Chatham, both of N.J.

[73] Assignee: Mikron Instrument Company, Inc., Wyckoff, N.J.

[21] Appl. No.: 354,605

[22] Filed: Mar. 4, 1982

[51] Int. Cl.³ .................. G01J 5/18; G01J 5/26; G01J 5/32

[52] U.S. Cl. .................. 356/43; 374/128; 374/133

[58] Field of Search .................. 356/43–50; 374/128, 133, 208

[56] References Cited

U.S. PATENT DOCUMENTS

| | | | |
|---|---|---|---|
| 3,448,283 | 6/1969 | Higley et al. | 356/43 X |
| 3,580,678 | 5/1971 | Roman | 356/43 |
| 3,925,668 | 12/1975 | Anderson et al. | 250/351 |
| 4,005,605 | 2/1977 | Michael | 250/338 X |
| 4,045,670 | 8/1977 | Anderson et al. | 250/338 |
| 4,081,678 | 3/1978 | Macall | 250/330 |
| 4,142,417 | 3/1979 | Cashdollar et al. | 356/45 X |
| 4,233,512 | 11/1980 | Rupert | 250/338 |
| 4,301,682 | 11/1981 | Everest | 374/133 X |

FOREIGN PATENT DOCUMENTS 2107862  5/1983  United Kingdom.

OTHER PUBLICATIONS

"Digital/Analog Infrared Thermometer", Australian Electronics Engineering, Nov. 1975, vol. 8, #11, p. 47.
"Mikron M65 Infrared Temperature Measurement & Control Apparatus", Mikron Instrument Company, Inc., Ridgewood, NJ 07451.

Primary Examiner—Vincent P. McGraw
Attorney, Agent, or Firm—Robert C. Podwil

[57] ABSTRACT

A two-wire transducer-transmitter for non-contact temperature measurement provides, in a unitary housing, a radiation sensing device producing a signal in response to sensed infrared or visible radiation, and electronic circuitry for processing the signal to provide at a two-wire output a current linearly proportional to the sensed target temperature, on the same two wires as input power preferably in the range of from 4 to 20 milliamperes D.C. full scale.

12 Claims, 3 Drawing Figures

FIG. 3

INFRARED TRANSDUCER-TRANSMITTER FOR NON-CONTACT TEMPERATURE MEASUREMENT

BACKGROUND OF THE INVENTION

This invention relates to an infrared transducer-transmitter for non-contact temperature measurement, and more particularly, to an infrared transducer-transmitter that measures temperature without contact with the target object, utilizing infrared or visible radiation and needing only two wires for receiving power as well as transmitting its output to receiving equipment.

A vital "front-end" of modern temperature measurement systems is a transducer and associated transmitter. The transducer-transmitter (sometimes hereinafter referred to as the "instrument") is normally expected to provide a strong linear output signal, preferably on the order of 4 to 20 milliamperes D.C., in proportion to the temperature of the target object. A current signal of this type and magnitude can readily be transmitted to receiving equipment with virtually no loss of signal due to transmission line resistance.

It is believed that instruments capable of producing such desirable current signals have heretofore been exclusively of the "contact" type, that is, of the type which physically contacts the target object. The present invention, however, relates to a novel transducer-transmitter of the non-contact type, capable of producing the desirable 4 to 20 milliamperes D.C. current output signal, linearly proportional to temperature, and having the further advantage of using only two wires for its power supply and its output to receiving equipment. Because it is a remote reading device, the present invention may be used with approved thermal and pressure barriers for intrinsically safe operation in hazardous locations, and it has, moreover, no moving parts. The present invention relates to an infrared transducer-transmitter for non-contact temperature measurement which challenges in its performance and versatility conventional contact temperature measurement devices, such as thermocouples and resistance thermometers.

Accurate measurement of surface temperatures of an object without contact, utilizing radiation emitted from the object, has of course been done for many years. See, for example, U.S. Pat. No. 4,005,605, issued Feb. 1, 1977 to Donald S. Michael, and assigned to the assignee of the present application. Indeed, the principles of remote temperature measurement have been extensively used in a variety of industrial, scientific and medical applications, Typical prior art apparatus of this type consists of (a) a sensing head, (b) an electronics package remote from the sensing head and (c) a cable or transmission line interconnecting the sensing head and the electronics package. Typically, the sensing head houses optical elements for gathering and focusing radiation, a detector for receiving the gathered radiation, some electronic elements and perhaps a sighting device, and is located near the target object. The electronics package typically provides for amplification of a signal incoming from the sensing head, and processing of the signal to provide, among other things, an adjustment for emissivity, linearization of the signal and compensation for ambient temperature influences. The electronics package, which is normally installed in the control room environment, may include a variety of millivolt and milliampere outputs which enable it to be used with selected display or control equipment.

The cable or transmission line interconnects the sensing head and the electronics package. The cable in such prior art devices may have any number of conductors, from two wires to several, and typically consists of shielded instrument cable in order to insure proper operation of the overall system. Since the signal produced by the sensing head is not normally characterized by high source resistance, transmission line resistance is the limiting factor in achieving high accuracy with prior art systems when long cables are used.

In the present invention, in distinct contrast to known systems, the desired linear output signal is produced by a self-contained signal transducer-transmitter, and the need for the conventional many-conductor transmission line (with its inherent limitations) is wholly eliminated. A single unit operating from a convenient unregulated power supply, provides a versatile and highly desirable two-wire output.

One difficulty which has been encountered by prior art two-wire infrared transducer designs capable of operating on conventional power supplies providing 12 to 40 volts D.C., and of the desired 4 to 20 milliamperes D.C. output linearly proportional to sensed temperature, stems from the fact that a maximum current of 4 milliamperes at 12 volts (a total of 48 milliwatts of energy) is available for consumption by the entire transducer. With known prior art devices, in order to measure the temperature of low temperature objects (i.e., those near room temperature), the techniques of "chopping" or scanning of the incoming radiation had to be used. Also, in order to compensate for ambient temperature variation of the sensing head, a constant temperature cavity was typically provided as a reference temperature source. Both of these techniques consume power to such an extent that the minimum power needs of instruments which employ them greatly exceeds the available 48 milliwatts.

As is set forth in greater detail below, the present invention has achieved the necessary accuracy and sensitivity, yet eliminated the need for a chopper, scanner or reference cavity. Consequently, in practicing the present invention, sufficient power is available to do the necessary electronic processing of the radiation-generated signal, and to produce the preferred 4 to 20 milliamperes D.C. linear current output. Of course, other less widely used and less desirable output current spans, such as 10 to 50 milliamperes are readily applicable. 1 to 5 milliamperes is, in theory, possible with the present invention.

SUMMARY OF THE INVENTION

The foregoing and other objects of this invention are realized in a presently preferred form of the invention by a transducer-transmitter apparatus in which a housing, which has an opening for admitting radiation from a target object, has optical means disposed within the opening and a radiation detector so disposed as to receive radiation from the optical means. Electronic components are also mounted within the housing, and spaced from its walls, and are responsive to a signal produced by the radiation detector means. In the presently preferred form of the apparatus, the electronic components amplify the output of the detector to a suitable level, apply compensation for ambient temperature variation of the instrument's environment, provide for necessary external adjustment for emissivity, linearize the signal, and finally provide a current output (preferably, at present, on the order of 4 to 20 milliamperes D.C. full scale span) for transmission to a "load". Significantly, the apparatus in accordance with the present invention is compatible with a two-wire power supply, and provides a two-wire output, suitable for use with conventional measuring, display, recording or controlling equipment.

DETAILED DESCRIPTION OF THE INVENTION

Figure 1:
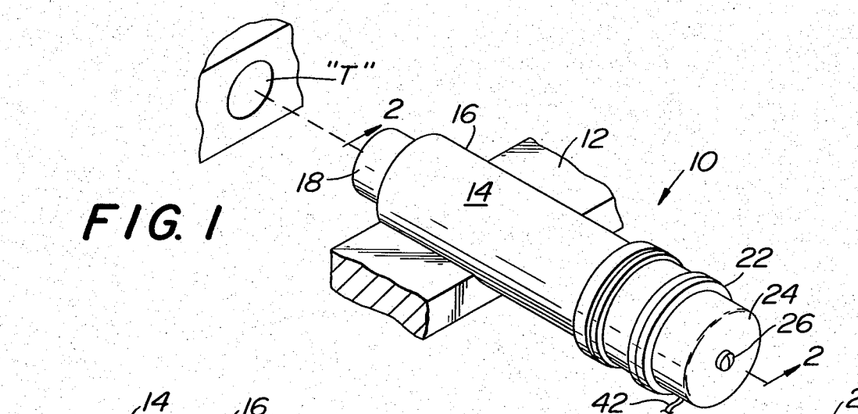
FIG. 1 is a perspective view of a transducer-transmitter apparatus for non-contact temperature measurement in accordance with the present invention.

Referring now to the drawings in detail, wherein like reference numerals designate like elements, there is seen in FIG. 1 a transducer-transmitter apparatus designed generally by the reference numeral 10.

The apparatus 10 is mounted in an illustrative support 12, which may in actuality be a thermal or other environmental barrier, such as the wall of a vessel. The apparatus 10 is aimed at a target object, designated by the letter "T", but does not contact the target object.

Figure 2:
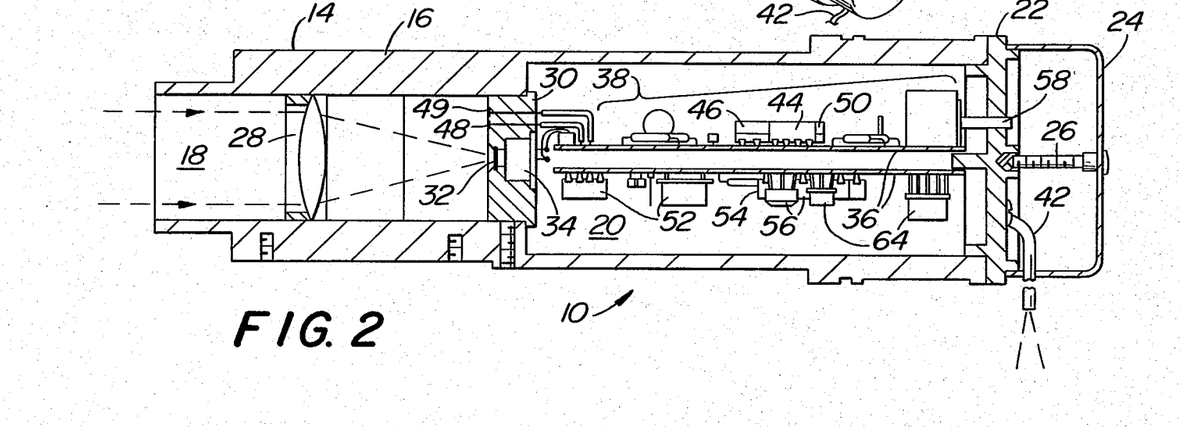
FIG. 2 is a cross-sectional view, taken along the line 2—2 in FIG. 1.

Referring to FIGS. 1 and 2, the apparatus 10 includes a housing 14 of generally elongated shape in its illustrated form. The housing 14 in the illustrated form of the apparatus 10 is made in three pieces for ease of assembly and disassembly, but other equivalent constructions could readily be used. In the illustrated form, the housing 14 comprises a main or body portion 16, which has an aperture or opening 18 (seen in FIG. 2) opening into a cavity 20. A rear cover member 22 closes the rear of the housing 14, and a protective cover 24 is affixed to the rear cover member 22, by, for example, a securing screw 26. The protective cover 24 serves to protect electrical connections and controls associated with the rear cover member 22.

Referring again to FIG. 2, mounted in the housing 14, in axial alignment with the aperture opening 18, is an optical assembly 28. The optical assembly may include refractive or reflective optical elements, such as lens, concave mirror, fiber optics or any combination of such elements which serves to collect and direct incident radiation from the target object "T" to a detector assembly 30. More specifically, radiation transmitted from the optical assembly 28 is collected and focused at the detector assembly 30. The detector assembly 30 preferably includes a suitable infrared filter 32 and an infrared detector 34 of a known (e.g., silicon, thermopile, germanium etc.) type, the filter 32 serving to prevent unwanted radiation from reaching the detector 34. The detector 34 converts incident infrared radiation to an electrical signal which is a function of the intensity of the incident radiation. The above-described optical features may also incorporate a non-parallax sighting system, not shown, to facilitate aiming of the apparatus 10.

Disposed within the cavity 20 of the housing 14 are printed circuit boards, designated by the reference numeral 36, upon which are mounted the electronic components, designated generally by the reference numeral 38, of the apparatus 10. In a preferred form of the apparatus 10, the printed circuit boards 36 extend forwardly from the rear cover member 22, and are preferably supported in spaced relationship with respect to the walls of the cavity 20, thus isolating the electronic components 38 from the walls to the extent possible to minimize thermal effects within the cavity 20.

Collectively, the electronic components 38 amplify the output of the detector assembly 30 to a suitable level, and then treat the signal so as to finally provide a linear current output proportional to the temperature of the target object, preferably in present contemplation, in a 4 to 20 milliamperes D.C. full scale range. The output may be transmitted to measuring, display, recording or controlling equipment located near or far from the apparatus 10 by a two-wire output/supply lead 42.

Figure 3:
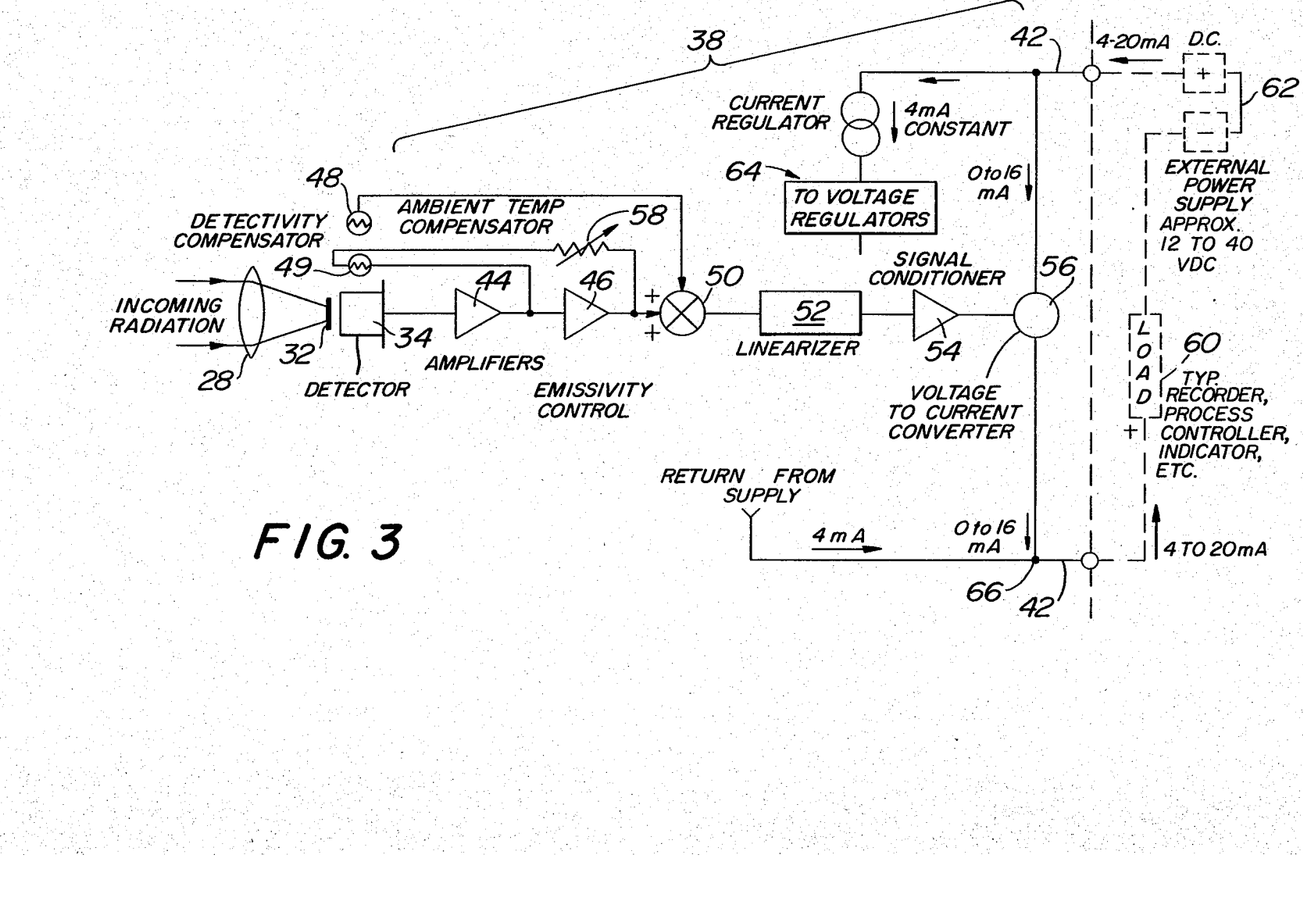
FIG. 3 is a block diagram of apparatus in accordance with the invention.

Referring now to FIGS. 2 and 3, the nature and operation of the electronic components 38 will be described in somewhat greater detail.

In the presently preferred form of the invention, the signal produced by the detector 34 is first amplified, as by first and second stage amplifiers 44 and 46.

The first stage amplifier 44 is a non-inverting operational amplifier, preferably of the "commutating auto zero" type, such as the currently available Intersil ICL 7601 (which has virtually no offset voltage or temperature coefficient).

The illustrated second stage amplifier 46 is a dual operational amplifier. The amplifier 46 receives a signal from the amplifier 44, and amplifies it further using one-half of the amplifier 46. The gain of the amplifier 46 is controllable externally by a potentiometer 58 (seen pictorially in FIG. 2), which provides for compensation for the emissivity of the target object. "Detectivity" compensation is achieved in a manner described below. The gain of detector 34 increases as detector temperature increases. To compensate for this, a thermistor 49 may be placed with the potentiometer 48 in the feedback loop (not illustrated) of the amplifier 46. The thermistor 49, which has a positive temperature coefficient electrically, is physically located as shown in FIG. 3, adjacent to the detector 34, and its temperature coefficient is matched to the temperature characteristics of the detector 34. In such an arrangement, changes in feedback resistance due to the thermistor 49 alter the gain of the amplifier 46.

Compensation for ambient (housing) temperatures is also applied to the signal in the amplifier 46 in the presently preferred embodiment. The detector 34, it will be understood, provides a signal only if the temperature of the target "T" differs from that of the detector 34. When the target "T" and the detector 34 are at the same temperature, a "dummy" signal must be created to provide a signal representative of target temperature. In FIGS. 2 and 3, a passive sensor 48, which is a thermistor having a negative temperature coefficient, provides a housing temperature-responsive signal which simulates the difference between the output of the detector 34 and a known reference temperature (i.e. 0° C. or 0° F.) This "imitation" signal is, in the preferred embodiment, buffered by one-half of the amplifier 46, and then added at a summing junction 50 to the output signal from the other half of the amplifier 46 to produce a composite non-linear output representative of the temperature of the target object "T".

Emissivity of the target object can be compensated for by adjusting the gain of the amplifier 46. One way in which this may be accomplished is by using the above-mentioned potentiometer 58 as a divider in the feedback loop of the amplifier 46. Emissivity compensation could also be accomplished, if desired, by adjusting the gain of the first stage amplifier 44. Another external adjustment (as by another potentiometer, not shown) may be provided for the overall gain of the amplifier 46, to set the overall span of the apparatus' readings.

The composite signal from the summing junction 50 is fed into a linearizer 52, which may use familiar analog or digital techniques (such as, for example, those referred to in U.S. Pat. No. 4,081,678, issued Mar. 23, 1981 to T. F. Macall).

In a presently preferred form of the invention, the linearizer 52 adds to the composite signal from the summing junction 50 a fixed voltage that references the signal to absolute zero (0° K. or −273° C.), and the composite signal referenced to absolute zero is then processed in a commercially available multi-function integrated circuit module in accordance with the formula:

$$V_{in}{}^m = V_{out},$$

the appropriate exponent "m" being determined by the design of the above-described detection and compensation circuitry. In the presently preferred form of the invention, the linearizer 52 employs as the multifunction module National Semiconductor Part No. NOLH10094 CD.

The output signal of the linearizer 52 goes into a signal conditioner 54, which is an inverting operational amplifier. The signal conditioner 54 subtracts a fixed voltage to remove the 0° K. reference previously applied to the signal by the linearizer 52. At this point, the signal is linear from the beginning to the end of the temperature range. This voltage signal may then be converted by means of a voltage-to-current converter 56 to produce a linear current signal proportional to the temperature of target object "T".

In one presently preferred form of the apparatus 10, the voltage-to-current converter 56 produces a 0 to 16 milliamperes linear current signal. This form of the apparatus 10 required an input of 4 milliamperes D.C. to operate the electronics, so that the apparatus 10 produced a 4 to 20 milliamperes D.C. linear output (4 milliamperes D.C. corresponding to the beginning of the measured temperature range and 20 milliamperes D.C. to the end of the range). Numerous conventional output devices designed for two-wire signal input, such as recorders, controllers, indicators, and the like (referred to in FIG. 3 as the "load" and designed generally by the reference numeral 60), can provide temperature-indicative displays in response to the output of the apparatus 10. The input resistance of the load 50 can vary from 0 ohms to 1500 ohms with no loss of accuracy of measurement.

Referring again to FIG. 2, the rear cover member 22 has screw terminals for connecting the above-mentioned lead 42, and also provides access to controls, such as the control for the potentiometer 58, (emissivity) and calibration adjustments.

Referring again to FIG. 3, an important advantage of the present invention is the ability of the apparatus 10 to provide the desired linear output signal using only two wires for power input and signal output. It will be seen in FIG. 3 that a single D.C. power supply 62 provides to the illustrated and presently preferred form of the apparatus 10 approximately 12 to 40 volts D.C. Required current is supplied to such apparatus 10 at a constant 4 milliamperes D.C. by supply regulator 64. The applied 4 milliamperes input, summed with the 0 to 16 milliamperes signal output at junction 66 provides the desired 4 to 20 milliamperes output current at the load 60.

The above-described apparatus 10 achieves, with a highly desirable two-wire transducer design, the accuracy and sensitivity needed for reliable non-contact temperature measurement. As has been seen, however, the apparatus 10 eliminates the need for a chopper or scanner and a reference cavity. The power consumption of the apparatus 10 has, therefore, been minimized, and consequently, sufficient power has been spared for electronic processing to provide the desired and needed range of linear current output. The apparatus 10 has integrated in a unique way the functions of the separate sensing head and electronic signal processing unit of the prior art, all in a single compact housing 14. It has been found that the housing 14 is sufficiently rugged to withstand normal industrial environments. The apparatus 10 may be placed, however, within a liquid cooling jacket (not illustrated) or associated with an air purge assembly (likewise not shown), and when so protected, the apparatus 10 can be expected to withstand the most punishing conditions to be found in industry. By way of example, using water at 75° F. as a coolant, the environment temperature of 450° F. (230° C.) can be tolerated, with water consumption of 4 gallons (15 liters) per hour through a cooling jacket. In industry environments contaminated by foreign particles or vapor, a sight tube air purge, with minimum consumption of air, can ensure proper operation for long periods of time.

The present invention may be embodied in other specific forms without departing from its spirit or essential attributes, and, accordingly, reference should be made to the appended claims rather than the foregoing specification as indicating the scope of the invention.

We claim:

1. Transmitter-transducer apparatus for non-contact temperature measurement wherein there is provided, on the same two wires, both a power supply current for the apparatus and an output signal current representative of a sensed target temperature, said apparatus comprising a housing, an opening in said housing for admitting to said housing radiation from a target object, optical means disposed in said opening in axial alignment with said opening, radiation detector means disposed in said housing in optical alignment with said optical means and adapted to receive radiation transmitted by said optical means, and signal processing means disposed in said housing and adapted to receive from said radiation detector means an electrical detector signal responsive to radiation incident on said radiation detector means, said signal processing means including means to amplify and linearize the signal to produce an output which is linearly proportional to the temperature of a target object, and a two-wire lead electrically connected to said signal processing means and adapted to be electrically connected to a remote power supply and a load, power supply regulator means operatively connected to said lead to supply to said apparatus a constant input current, and elecrical circuit means for summing said input current and the output current of said signal processing means to produce the output current of the apparatus, said lead being electrically connected to said circuit means whereby both the power supply current for the apparatus and the output signal current are carried by said lead.

2. Apparatus in accordance with claim 1, wherein said input current to said signal processing means is about 4 milliamperes D.C. and said output signal of said signal processing means is a current linearly proportional to the temperature of a target object and in a range of about 4 to 20 milliamperes D.C.

3. Apparatus in accordance with claim 1, wherein said signal processing means comprises amplifier means for amplifying the detector signal, means for sensing ambient temperature within said housing and for producing an ambient temperature signal responsive to the ambient temperature in said housing, means for summing the ambient temperature signal and the detector signal, and means for linearizing and conditioning the summed signals.

4. Apparatus in accordance with claim 3, wherein said signal processing means provides a two-wire output.

5. Apparatus in accordance with claim 3, wherein said amplifier means includes selectively adjustable means to compensate for emissivity.

6. Apparatus in accordance with claim 3, wherein said signal processing means comprises means adjacent the radiation detector means for sensing the temperature of said radiation detector means and for producing a signal responsive to the temperature of said detector means, and means for applying said signal responsive to the temperature of said detector means to said signal processing means so as to provide compensation in the detector signal for the temperature of said detector means.

7. Apparatus in accordance with claim 6, wherein said amplifier means includes selectively adjustable means to compensate for emissivity.

8. Apparatus in accordance with claim 1, wherein said output current is in the range of about 1 to 50 milliamperes D.C.

9. Apparatus in accordance with claim 8, wherein said output eurrent is in the range of about 4 to 20 milliamperes D.C.

10. Transducer-transmitter apparatus for non-contact temperature measurement, comprising a generally elongated housing, an opening in said housing for admitting to said housing radiation from a target object, optical means disposed in said opening in axial alignment with said opening, radiation detector means disposed in said housing in optical alignment with said optical means and adapted to receive radiation transmitted by said optical means, signal processing means disposed in said housing for processing a detector signal produced by said detector means to produce a two-wire current output signal linearly proportional the temperature of the target object and in the range of about 1 to 50 milliamperes D.C., mounting means in said housing for said signal processing means, said mounting means comprising circuit board means coupled to said housing to support said signal processing means in spaced relation to the walls of said housing, and a rear cover member for said housing, said circuit board means projecting forwardly from said rear cover member.

11. Apparatus in accordance with claim 10, wherein said housing includes a tubular bore, said optical means being disposed in axial alignment with said bore, said detector means being disposed in said housing in axial alignment with said bore and said optical means, and said rear cover member being disposed in axial alignment with said bore and remote therefrom, said circuit board means projecting forwardly from said rear cover member toward said bore.

12. Apparatus in accordance with claim 10, and a two-wire lead electrically connected to said signal processing means to provide said two-wire output and a power input means for said signal processing means, power supply voltage regulator means operatively connected with said lead to provide to said signal processing means a constant input current, and electrical circuit means for adding the input current and the output current of said signal processing means to produce the output of the apparatus.

* * * * *

REEXAMINATION CERTIFICATE (1379th)
United States Patent [19]
Keikhosrow et al.

[11] B1 4,527,896
[45] Certificate Issued  Nov. 6, 1990

[54] INFRARED TRANSDUCER-TRANSMITTER FOR NON-CONTACT TEMPERATURE MEASUREMENT

[75] Inventors: Irani Keikhosrow, Franklin Lakes; Michael G. MacBurney, Chatham, both of N.J.

[73] Assignee: Mikron Instrument Co., Inc., Wyckoff, N.J.

Reexamination Request:
No. 90/001,827, Aug. 17, 1989

Reexamination Certificate for:
Patent No.: 4,527,896
Issued: Jul. 9, 1985
Appl. No.: 354,605
Filed: Mar. 4, 1982

[51] Int. Cl.$^5$ ............ G01J 5/18; G01J 5/26; G01J 5/32
[52] U.S. Cl. ............ 356/43; 374/128; 374/133
[58] Field of Search ............ 356/43; 374/128, 133

[56] References Cited

U.S. PATENT DOCUMENTS

| | | | |
|---|---|---|---|
| 3,503,261 | 3/1890 | Riester et al. | 73/362 |
| 3,562,729 | 2/1971 | Hurd, III | 340/210 |
| 3,573,599 | 4/1971 | Rose | 330/10 |
| 3,680,384 | 8/1972 | Grindheim | 73/361 |
| 3,777,568 | 12/1973 | Risgin et al. | 374/133 X |
| 3,956,682 | 5/1976 | Van Dyck | 318/640 |
| 3,993,947 | 11/1976 | Maltby et al. | 324/60 R |
| 4,084,155 | 4/1978 | Hertzl et al. | 340/210 |
| 4,146,834 | 3/1979 | Maltby et al. | 324/60 R |
| 4,205,327 | 5/1980 | Dahlke | 340/208 |
| 4,232,300 | 11/1980 | Wright et al. | 340/840.39 |
| 4,238,965 | 12/1980 | Mate | 364/510 |
| 4,250,490 | 2/1981 | Dahlke | 340/870.37 |
| 4,301,682 | 11/1981 | Everest | 374/133 X |

FOREIGN PATENT DOCUMENTS

1805918 7/1969 Fed. Rep. of Germany .
1951523 12/1971 Fed. Rep. of Germany .
2637295 1/1981 Fed. Rep. of Germany .

OTHER PUBLICATIONS

Rosemont Model 444 Product Bulletin, "ALPHA-LINE TEMPERATURE TRANSMITTER AND ASSEMBLIES" (Rosemount, Inc., 1977).
National Semiconductor Data Sheet LH0045/LH0045c, "OPERATIONAL AMPLIFIERS/BUFFERS", LH0045/LH0045c "TWO-WIRE TRANSMITTER" (Date Unknown–1980?).
Linear Laboratories product brochure "TherMonitor Model TM 1000 Non–Contact Infrared Radiometer" (Copyright notice dated 1981).
Action Instruments Co., Inc. Bulletin, "Two–Wire Transmitter Basics" (Jun., 1979).
National Semiconductor Data Sheet AN211, "New Op Amp Ideas" (1978), FIGS. 20 and 21.
National Semiconductor Data Sheet LB–40, "Two Wire Current Transmitters" (1978) [Best copy at hand].
Ray Tek product bulletin "Thermalert LC–814 Systems" (date unknown).
Towle, LC "Design Requirements for Analogue Transmitters for use in Hazardous Atmospheres", Transaction Paper, 3.74, Institute of Measurement and Control (1973–1974 session).
RDF Corporation, product brochure "Two Wire Temperature Transmitter Series–2600," date unknown.
Oppelt: "Kleines Handbuch technischer Regelvorgänge", 4. Auflage, Weinheim 1964, Seite 278, 279.
Archiv für technisches Messen ATM J 321-3, Issue 219, Seiten 87, 88 'Ardonox', Apr. 1954.
Fachberichte Hüttenpraxis Metallweiterverarbeitung, 1976, Sonderdruck 9 und 10/76.
ATM 214–9, Lieferung 276, Seiten 11 bis 14, Jan. 1959.
Leneweg: Handbuch der technischen Temperaturmessung, Braunschweig 1976, Seite 378.
National Semiconductor publication "Data Conversion," Data Sheet LM10/LM10B(L)/LM10 c(L), pp. 3–88,89 publication date unkown, but possibly 1980.

*Primary Examiner*—P. Vincent McGraw

[57] ABSTRACT

A two-wire transducer-transmitter for non-contact temperature measurement provides, in a unitary housing, a radiation sensing device producing a signal in response to sensed infrared or visible radiation, and electronic circuitry for processing the signal to provide at a two-wire output a current linearly proportional to the sensed target temperature, on the same two wires as input power preferably in the range of from 4 to 20 milliamperes D.C. full scale.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-12 is confirmed.

* * * * *

REEXAMINATION CERTIFICATE (2208th)
United States Patent [19]
Irani et al.

[11] B1 4,527,896
[45] Certificate Issued Feb. 1, 1994

[54] INFRARED TRANSDUCER-TRANSMITTER FOR NON CONTACT TEMPERATURE MEASUREMENT

[75] Inventors: Keikhosrow Irani, Franklin Lakes; Michael G. MacBurney, Chatham, both of N.J.

[73] Assignee: Mikron Instrument Company, Inc., Wyckoff, N.J.

Reexamination Request:
No. 90/002,840, Sep. 22, 1992

Reexamination Certificate for:
Patent No.: 4,527,896
Issued: Jul. 9, 1985
Appl. No.: 354,605
Filed: Mar. 4, 1982

[51] Int. Cl.$^5$ ............ G01J 5/18; G01J 5/26; G01J 5/32
[52] U.S. Cl. .................. 356/43; 374/128; 374/133
[58] Field of Search ............... 356/43; 374/128, 133

[56] References Cited

U.S. PATENT DOCUMENTS

3,580,678  5/1971  Roman .................. 356/43
3,777,568  12/1973  Risgin et al. .
3,992,943  11/1976  Schiefer et al. .
4,301,682  11/1981  Everest ............ 250/338 X

FOREIGN PATENT DOCUMENTS

116742  9/1976  Japan .
54-177986  12/1979  Japan .

OTHER PUBLICATIONS

Inose et al. "Micropower Transducer Circuits for Two-Wire Transmitters", Proceedings of the 24th Annual ISA Conference, Houston—Oct. 27–30, 1969.
Land Pyrometer System 2 Operating Instructions for Land Thermometer ORL0.3/6F35P75 with Electronic Signal Processing Unit 2U-RL0.3/4F-A published at least as early as 1976.
National Semiconductor, "LH0094 Multifunction Converter", pp. 9-8 through 9-16, Circa. 1980.

*Primary Examiner*—Vincent P. McGraw

[57] ABSTRACT

A two-wire transducer-transmitter for non-contact temperature measurement provides, in a unitary housing, a radiation sensing device producing a signal in response to sensed infrared or visible radiation, and electronic circuitry for processing the signal to provide at a two-wire output a current linearly proportional to the sensed target temperature, on the same two wires as input power preferably in the range of from 4 to 20 milliamperes D.C. full scale.

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 2 and 8–12 is confirmed.

Claim 1 is cancelled.

Claim 3 is determined to be patentable as amended.

Claims 4–7, dependent on an amended claim, are determined to be patentable.

3. Apparatus in accordance with claim [1] *2*, wherein said signal processing means comprises amplifier means for amplifying the detector signal, means for sensing ambient temperature within said housing and for producing an ambient temperature signal responsive to the ambient temperature in said housing, means for summing the ambient temperature signal and the detector signal, and means for linearizing and conditioning the summed signals.

* * * * *